F. V. MADALER.
COMBINED PICTURE PROJECTING MACHINE AND PHONOGRAPH.
APPLICATION FILED AUG. 24, 1920.
1,408,620.
Patented Mar. 7, 1922.
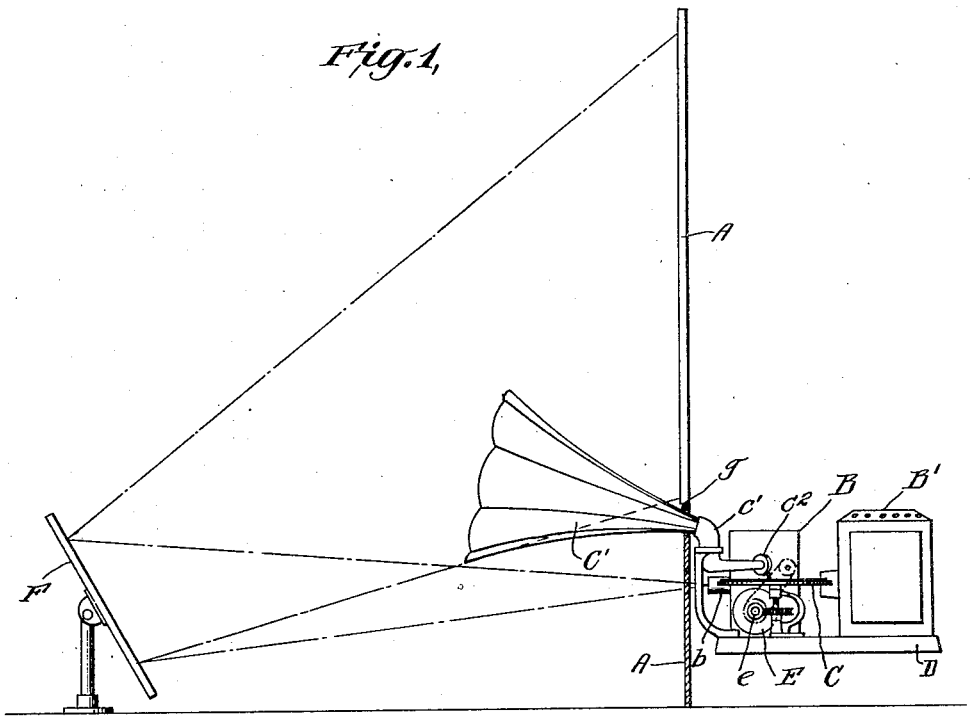
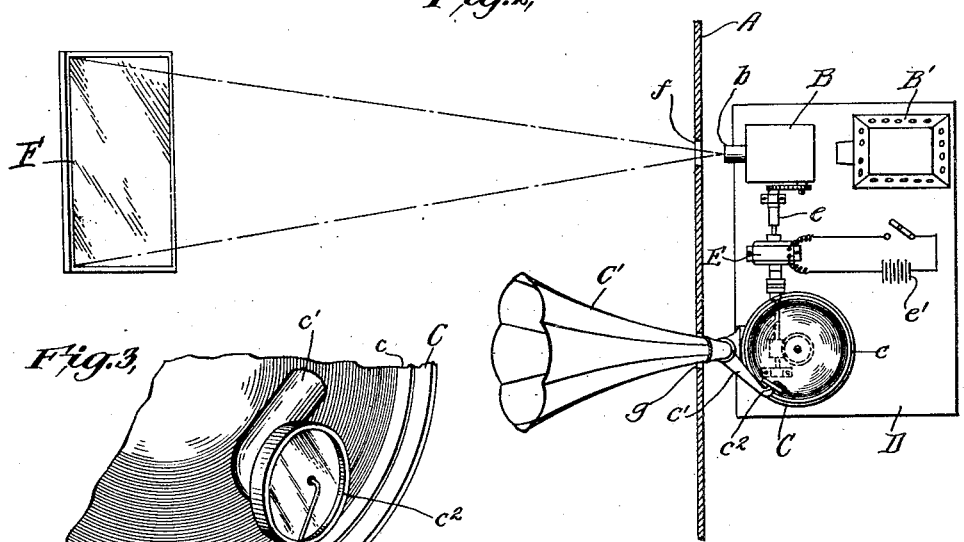
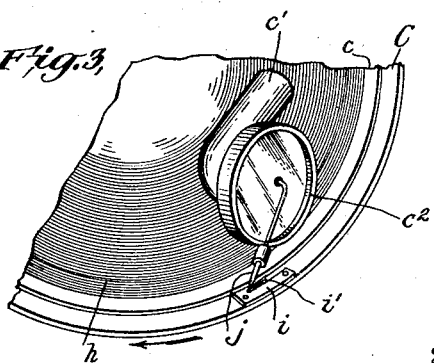
Inventor
Ferdinand Madaler
By his Attorney

UNITED STATES PATENT OFFICE.

FERDINAND V. MADALER, OF GOOD GROUND, LONG ISLAND, NEW YORK, ASSIGNOR TO AUDIBLE PICTURES CORPORATION, OF BROOKLYN, NEW YORK, A CORPORATION OF NEW YORK.

COMBINED PICTURE-PROJECTING MACHINE AND PHONOGRAPH.

1,408,620.     Specification of Letters Patent.     Patented Mar. 7, 1922.

Application filed August 24, 1920. Serial No. 405,774.

*To all whom it may concern:*

Be it known that I, FERDINAND V. MADALER, a subject of Austria, residing at Good Ground, Long Island, State of New York, have invented a certain new and useful Combined Picture-Projecting Machine and Phonograph, of which the following is a specification.

This invention is an apparatus wherein moving pictures are displayed upon a screen and simultaneously therewith a phonograph operates to render an oral production appropriate to the picture display and in synchronism therewith.

According to this invention, the picture projector and the phonograph mechanism are positioned into close relation to each other and in close relation to a screen, to the ends that said projector and phonograph may be operated synchronously, and to secure the effect of a picture display and an oral rendition in the same transverse plane afforded by the screen, the beam of light with the pictures being initially thrown by the projector upon a distant mirror acting to reflect the pictures upon the screen.

The invention embodies, also, means for initially locating the stylus of the phonograph reproducer at the starting point in the record groove, to the end that at the commencement of the performance the oral rendition by the phonograph mechanism will be in harmony with the display of the pictures by the projecting mechanism.

Other functions and advantages of the invention will appear from the following description taken in connection with the drawings, wherein—

Figure 1 is a view partly in vertical section and partly in elevation illustrating the embodiment of my apparatus for use within a moving picture playhouse or other place suitable for public performances.

Figure 2 is a sectional plan view of the apparatus.

Figure 3 is a detail perspective view of the means for initially locating the reproducer stylus at the point of beginning of the groove in a phonograph record.

A designates a wall or partition provided within a place of public performance or a motion picture theatre, said wall or partition being adapted for use as a screen upon which motion pictures are displayed. The wall is erected on or adjacent to a stage, proscenium, or other part of the structure so as to separate the auditorium from the rear part of the place of amusement. In addition to its function as a screen, or as the means for supporting a screen, the wall or partition serves as a barrier to the transmission of the noise occasioned by the operation of the motion picture projecting machine B and the phonograph C; in other words, the scratch of the stylus in contact with the record of the phonograph and the noise incidental to the operation of the film feeding mechanism in the projecting machine are confined by the wall, partition, or barrier A to the chamber in the rear thereof.

As shown, the projecting machine and the phonograph are positioned close to the barrier A rearwardly thereof, and close to each other, it being preferred to support such projecting machine and the phonograph on a base member D, the latter acting as the support, also, for a motor E, which motor is common to the two machines B, C, as disclosed in an application filed by me on even date and copending herewith, Serial No. 405,773. The motor is shown as an electric motor positioned intermediate the projecting machine and the phonograph, the motor shaft $e$ being operatively connected with the projecting machine B and with the record carrier of the phonograph, whereby the motor serves as a common driving means for the two machines and the combined mechanism acts to obtain a display of motion pictures in synchronism with an oral rendition by the phonograph. Of course, any desired means for driving the phonograph and the projecting machine may be substituted for the motor E, but an electric motor affords a suitable and universally adaptable means for the desired operation of the combined machine. It is apparent that electric energy from any available source may be supplied to the motor, such as a storage battery $e'$ in an electric circuit which includes a suitable switch, see Figure 2.

The projecting machine A is or may be of any type known to the art, said machine being shown as having a lens tube $b$ and said machine being positioned in close relation to an aperture $f$ provided in the wall or partition A, whereby a beam of light may be thrown by the projecting machine B upon a mirror F. With the projecting machine is associated a housing B' for an electrical lamp, or other light producing means, the beam from which lamp passes through the machine B and the picture film (not shown) so that the lenses of the machine B will throw the light beam and the pictures upon the mirror. Said mirror is positioned at a suitable distance from the screen so as to intercept the beam of light from the projecting machine, and said mirror is of such nature and occupies such relation to the screen that said mirror reflects the pictures for displaying the same upon the screen in order to be viewed by the occupants of the auditorium.

The phonograph is similar to machines ordinary in the art with the exception that it is driven with the projecting machine from a motor. Said phonograph includes a rotatable record carrier $c$, a tone-arm $c'$ with a reproducer $c^2$, and a sound amplifier in the form of a horn C'. As shown, the phonograph mechanism is positioned close to the wall or barrier A, the latter being formed with an aperture $g$ through which passes the neck of the phonograph horn (see Figure 2) whereby said horn is adapted to be coupled with the tone arm $c'$ of the phonograph located rearwardly of the barrier A, whereas the sound amplifier or horn C' projects forwardly of said barrier. Of course, the horn may be omitted, and the oral reproduction by the phonograph be transmitted from the reproducer on the tone-arm through the apex $g$, but in public amusement places the use of a sound amplifier of one form or another is desirable in order that the oral reproduction may be audible to the occupants of the auditorium.

In an apparatus wherein the projecting machine and the phonograph are mechanically associated with a motor drive, it is important that the display of the pictures and the rendition of an oral production shall be in harmony, and to these ends I provide means whereby at the beginning of the performance the phonograph shall be timed to start the oral production with the picture display. Accordingly, I provide means for initially locating the reproducer stylus at the beginning of the record groove, one form of which stylus positioning means is shown in Figure 3. The record is shown as a flat disk C with a record groove $h$ of spiral form beginning at a point near the edge of the disk, as usual. At the start of the spiral groove, the record C is provided with a stylus locater $i$, the same being shown as a plate attached in a suitable way to the record, said plate being provided with a notch $i'$ the closed end of which is opposite to, or in the transverse plane of, the starting end of the record groove $h$. The phonograph reproducer $c^2$ is provided as usual with a stylus $j$, and prior to starting the phonograph into action tone arm $c'$ and the reproducer are adjusted relatively to the record C and carrier $c$ so that the stylus $j$ enter the notch $i'$ of the locating plate until the stylus abuts the closed end of the notch in said plate, thus locating the reproducer with precision at the starting point of the record groove. The notch of the locating plate $i$ faces or opens in a direction opposite to the direction of rotation of the able $c$ and record C, so that at the start of the phonograph the movement of the record C with the table carries the notched plate away from the reproducer stylus, the latter traveling in the spiral groove on the successive rotations of the record so that the position of the stylus is gradually shifted inwardly with reference to the record, thus precluding contact of the stylus with the locating plate on the subsequent rotations of the record.

In operation, the phonograph is supplied with a record appropriate to the subject matter on the film of the projecting machine, and the motor is started to impart motion to the projecting machine and the phonograph. The beam of light from the projecting machine is reflected by the mirror F to effect the display of pictures on the screen, and simultaneously therewith the phonograph acts to produce an oral rendition of a song, recitation, or other subject matter in harmony with the picture display.

Having thus fully described the invention, what I claim as new and desire to secure by Letters Patent is:

1. In an apparatus of the class described, a wall or partition provided with a light aperture and a sound aperture, said wall or partition affording a screen and acting as a sound barrier, a picture projecting mechanism adjacent the light aperture, a phonograph mechanism adjacent the sound aperture, means for driving the phonograph mechanism in synchronism with the picture mechanism, and means for intercepting the beam of light from the projecting mechanism and throwing the same upon said screen.

2. In an apparatus of the class described, a wall or partition provided with a light aperture and with a sound aperture, said wall or partition affording a screen, picture projecting mechanism on one side of the wall and adjacent the light aperture, phonograph mechanism on the same side of the wall and adjacent the sound aperture, said phonograph mechanism including a sound amplifier positioned on the opposite side of the wall, means for imparting motion to the phonograph mechanism and the picture projecting mechanism, and means in the path of the beam of light from said projecting mechanism for throwing the same upon the screen of said wall.

In testimony whereof I have signed my name this 6th day of August, 1920.

FERDINAND V. MADALER.